US006979086B2

(12) United States Patent
Hu

(10) Patent No.: US 6,979,086 B2
(45) Date of Patent: Dec. 27, 2005

(54) PROJECTOR AND STATUS PROTECTION METHOD THEREOF

(75) Inventor: Chia-Chan Hu, Taipei (TW)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 10/702,475

(22) Filed: Nov. 7, 2003

(65) Prior Publication Data

US 2004/0120149 A1 Jun. 24, 2004

(30) Foreign Application Priority Data

Dec. 20, 2002 (TW) .............................. 91136929 A

(51) Int. Cl.[7] ............................................... G03B 21/16
(52) U.S. Cl. .......................................... 353/57; 353/52
(58) Field of Search ............................. 353/52, 57, 58, 353/85, 121, 122; 315/51–54, 32, 112, 117, 315/118, DIG. 7; 349/72, 62; 348/74

(56) References Cited

U.S. PATENT DOCUMENTS 5,534,854 A * 7/1996 Bradbury et al. ........... 340/648
RE36,060 E * 1/1999 Miyashita ................... 348/748
6,262,549 B1 7/2001 Yang et al.
6,698,898 B2 * 3/2004 Terami et al. ................ 353/52
6,702,444 B2 * 3/2004 Takizawa et al. ............. 353/52
6,840,625 B2 * 1/2005 Koyama et al. .............. 353/31
2002/0118342 A1 * 8/2002 Ohfune et al. ................ 353/57
2003/0227765 A1 * 12/2003 Kubo .......................... 362/20

* cited by examiner

*Primary Examiner*—W. B. Perkey
*Assistant Examiner*—Andrew Sever
(74) *Attorney, Agent, or Firm*—Birch, Stewart, Kolasch & Birch, LLP

(57) ABSTRACT

A projector. A lamp serves as a light source for the projector. A starter turns on the lamp. An image processing system generates a projected image according to a video signal. A CPU controls the image processing system. A plurality of cooling fans positioned at least near the power supply, the lamp, or the image processing system to reduce the temperature around the cooling fans and respectively generating pulse signals corresponding to the rotational speed of the cooling fan. A charging circuit generates a continuous charging signal and generates a protection active signal to reset the CPU, shut down the power supply or the lamp.

8 Claims, 5 Drawing Sheets

PROJECTOR AND STATUS PROTECTION METHOD THEREOF

This Nonprovisional application claims priority under 35 U.S.C. § 119(a) on Patent Application No(s). 091136929 filed in TAIWAN on Dec. 20, 2002, the entire contents of which are hereby incorporated by reference.

BACKGROUND OF THE INVENTION

The present invention relates in general to a projector and a status protection method thereof. In particular, the present invention relates to a projector and a status protection method using hardware to detect and control the rotational speed of the fans of the projector.

DESCRIPTION OF THE RELATED ART

Conventional projectors implement a plurality of fans to dissipate heat generated by the lamps and power supply. Thus, the projector is more reliable when the operating temperature decreases to a default temperature.

The CPU controls the startup and rotational speed of the cooling fans. The CPU detects the temperature inside the projector by thermal sensors and adjusts the rotational speed of the fans according to the temperature information fed back from the thermal sensors dissipate heat and reduce noise generated by the cooling fans. A latch circuit, coupled to a comparator and a fan unit, is used to receive signals and to output a signal which is explained in U.S. Pat. No. 6,262,549, the disclosure of which is incorporated herein by reference in its entirety.

The cooling fans of the projector, however, become operational by a high start-voltage and the noise and electrostatic discharge generated thereby may interfere with the CPU. In this case the CPU is unable to control the rotational speed of the fans and errors may occur due to excessive heat.

A conventional method of solving the above mentioned problem is to reset the CPU after the lamps have been operational for a predetermined time, for example, about 2 seconds, to ensure normal CPU operation. In addition, the conventional method also interrupts the operation of the projector by thermal interceptors when the detected temperature exceeds a predetermined temperature.

However, the conventional method only resets the CPU during the initial start up of the projector. The CPU, however, might experience interference at any time during operation of the projector. Thus, the conventional method does not address the problem of CPU interference due to noise during projector operation. Additionally, even if the CPU performs normally, the disadvantage of using thermal interceptors is that they require a large error margin, which may cause the system shut down unnecessarily due to the high sensitivity of the thermal interceptors.

SUMMARY OF THE INVENTION

The object of the present invention is thus to provide a projector and a status protection method thereof using hardware to detect and control the rotational speed of the projector fans to avoid excessive temperature in the projector without requiring the use of the CPU. Thus, the problem of excessive heat in the projector due to CPU interference by noise and electrostatic discharge from the high voltage start up requirement is prevented.

To achieve the above-mentioned object, the present invention provides a projector and a lamp serves as a light source for the projector. A starter turns on the lamp. An image processing system generates a projected image according to a video signal. A CPU controls the image processing system. A plurality of cooling fans are positioned around at least the power supply, the lamp or the image processing system to reduce temperature and respectively generate pulse signals corresponding to the rotational speed of the cooling fan. A charging circuit generates a continuous charging signal and a protection active signal to reset the CPU, and shut down the power supply or the lamp.

In addition, the present invention provides a status protection method of a projector having a CPU, a lamp, and a cooling fan for outputting a pulse signal having a frequency corresponding to the rotational speed of the cooling fan. The method comprises the steps of generating a continuous charging signal according the pulse signal output from the cooling fan, obtaining voltage levels of the charging signal, comparing the voltage level of the continuous charging signal with a reference voltage and generating a comparison signal with different voltage levels responding to the comparison result, comparing the comparison signal and a boot-delay signal and outputting a logic signal with a logic level, and latching the logic level and generating a protection active signal to at least the power supply, the lamp or the CPU when the voltage level of the logic signal changes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
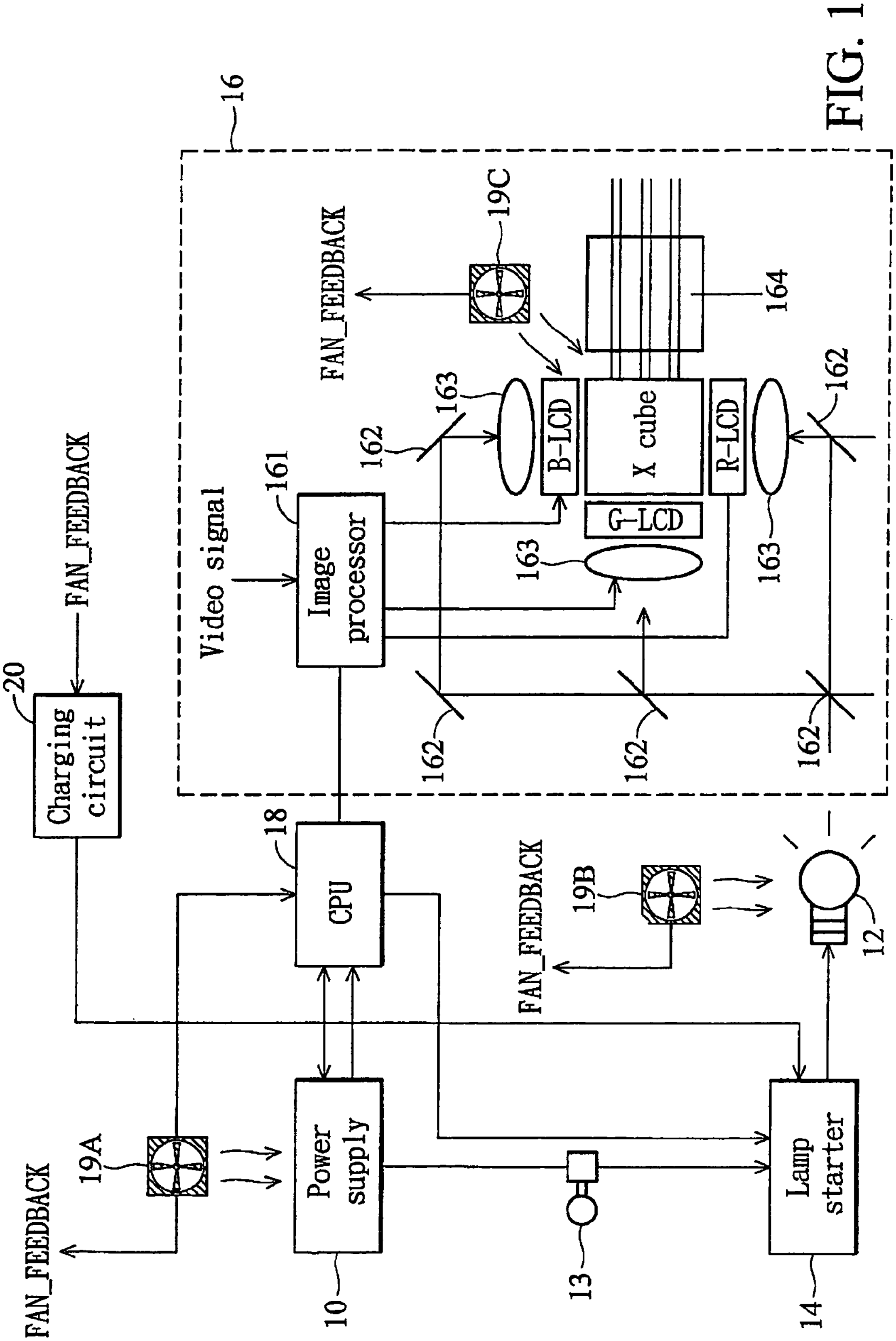
FIG. 1 shows a block diagram of the projector according to the embodiment of the present invention.

FIG. 1 shows a block diagram of the projector according to the embodiment of the present invention. The power supply 10 provides the power to the projector. The lamp 12 provides a light source for the projector. In addition, the starter 14 lights the lamp 12 on, and the conventional thermal interceptor is located near the starter 14.

The image processing system 16 includes an image processor 161 for outputting image controlling signals according to the input video signals comprising R, G, B and horizontal and vertical signals. The reflectors 162 reflect light from the lamp 12 to the liquid crystal display panel LCD. The LCD panel displays the image according to the image controlling signals. Thus, the light passing through the LCD panel and filtered by the attachment lens 163 outputs the projected image via the projector lens 164. The CPU 18 controls the image processor 161 and provides signals enabling the starter 14 to start the lamp. In addition, a plurality of cooling fans are respectively positioned near the power supply 10, the lamps 12 and the image processing system 16, to reduce the temperature and output the rotational speed signals corresponding to their rotational speed. Here, two pulses (rotational speed signals) are generated when the cooling fan completes one rotation. When the rotational speed of the cooling fan increases, the frequency of the rotational speed signal FAN_FEEDBACK also increases. Conversely, when the rotational speed of the cooling fan decreases, the frequency of the rotational speed signal FAN_FEEDBACK also decreases. Thus, the charging circuit 20 obtains the rotational speed of the cooling fan according to the frequency of the rotational speed signal FAN_FEEDBACK, and outputs a determination signal representing normal or abnormal cooling fan rotational speed. The determination signal is input to the CPU 18, the power supply 10 and the lamps 12 to reset the CPU 18, turning off the system power by shooting down the power supply 10 and turning off the lamps 12.

Figure 2:
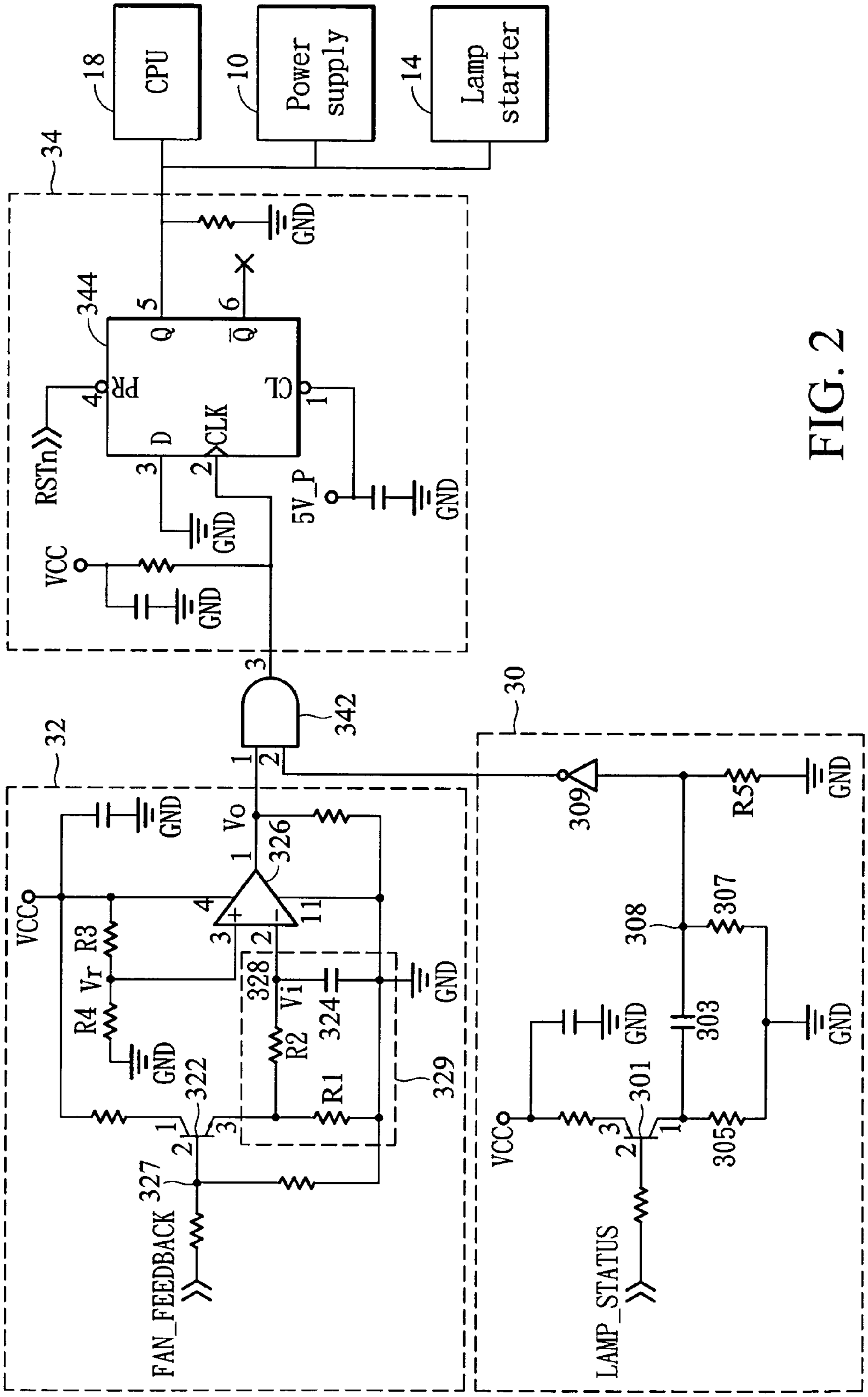
FIG. 2 is a circuit showing the charging circuit according to the embodiment of the present invention.

FIG. 2 is a circuit showing the charging circuit according to the embodiment of the present invention. The charging circuit according to the embodiment of the present invention comprises a boot-delay signal generating circuit 30, a fan-pulse feedback circuit 32 and a status latch and protection drive circuit 34.

The boot-delay signal generating circuit 30 comprises a PNP transistor 301 and a plurality of resistors and capacitors. The emitter of the PNP transistor 301 is connected to a resistor. The other terminal of the resistor is connected to the Vcc and a capacitor. The base of the PNP transistor 301 is connected to the signal terminal LAMP_STATUS of the starter 14. The collector of the PNP transistor 301 is connected to the resistor 305 and the capacitor 303. The other terminal of the capacitor 303 is connected to the resistor 307, and the other terminals of the resistors 305 and 307 are grounded. The output 308 of the boot-delay signal generating circuit 30 is coupled to ground through the resistor R5.

The fan-pulse feedback circuit 32 comprises an NPN transistor 322, a comparator 326, an RC charging unit 329, and a plurality of resistors and capacitors. The base 327 of the NPN transistor 322 is connected to the rotational speed signal FAN_FEEDBACK output from the cooling fan. The collector of the NPN transistor 322 is coupled to Vcc through a resistor. The emitter of the NPN transistor 322 is connected to the resistors R1 and R2 of RC charging unit 329. The other terminal of the resistor R2 is connected to a capacitor, and the other terminals of the capacitor and the resistor R1 are grounded. In addition, the connection point 328 of the resistor R2 and the capacitor is connected to the reverse input terminal of the comparator 326, and the non-reverse input terminal of the comparator 326 is connected to the connection point of the resistors R3 and R4, which are connected between Vcc and ground. The output terminal of the comparator 326 is connected to a grounded resistor. Here, the voltage level of the non-reverse input terminal of the comparator 326 is labeled Vr, the voltage level of the reverse input terminal of the comparator 326 is labeled Vi, and the voltage level of the output terminal of the comparator 326 is labeled Vo.

The status latch and protection drive circuit 34 comprises an AND logic gate 342, a D-type flip-flop 344 and a plurality of resistors and capacitors. One input terminal of the AND logic gate 342 is connected to the output terminal Vo of the comparator 326, the other input terminal of the AND logic gate 342 is connected to the output terminal 308 of the boot-delay signal generating circuit 30, and the output terminal of the AND logic gate 342 is coupled to Vcc trough a resistor. The Vcc is also connected a grounded capacitor. In addition, the terminal CLK of the D-type flip-flop 344 is connected to the output of the AND logic gate 342, its D terminal is grounded, its reset terminal PR is connected to the boot signal terminal and its terminal CL is connected to a grounded capacitor and a 5 volt voltage. When the projector is started, the boot signal RSTn received by the reset terminal PR of the D-type flip-flop 344 is at high level.

The CPU performs a system self-test procedure when powered on. The system self-test procedure comprises detecting the environmental temperature and the status of the cooling fans and others peripheral units. If the system self-test procedure is passed, the lamp is then turned on. Additionally, the CPU provides the boot signal RSTn to the reset terminal PR of the D-type flip-flop 344. When the lamp is turned on successfully, the starter 14 returns the signal LAMP_STATUS to the boot-delay signal generating circuit 30, wherein the signal LAMP_STATUS is at low logic level "0". If the lamp is no successfully turned on, the starter 14 returns a high logic level "1" as the signal LAMP_STATUS. Next, the charging circuit 20 is enabled after the system exhibits stability for a predetermined period.

Due to the high voltage start up requirement, when the projector is first started it is unstable and the CPU must be reset after a predetermined period. Thus, the boot-delay signal generating circuit 30 is required to enable the charging circuit 20 after a predetermined period, for example, 2 sec, to avoid generating error information. Referring to the boot-delay signal generating circuit 30 in FIG. 2, when the logic level of the signal LAMP_STATUS is switched to "0", representing that the lamp has been successfully turned on, the PNP transistor 301 is also turned on. Thus, the voltage between both terminals of the resistor 305 is increased. Therefore, the voltage level of the node 308 is increased by electric coupling of the capacitor 303. After a predetermined delay period, the voltage level of the node 308 is reduced to a low voltage level by leakage current. Thus, a high logic level signal is input to the AND logic gate by inverting the low voltage level of the node 308 with the inverter 309. Here, the delay period is set by adjusting the capacitance of the capacitor 303 and the resistances of the resistors 305 and 307.

Figure 3:
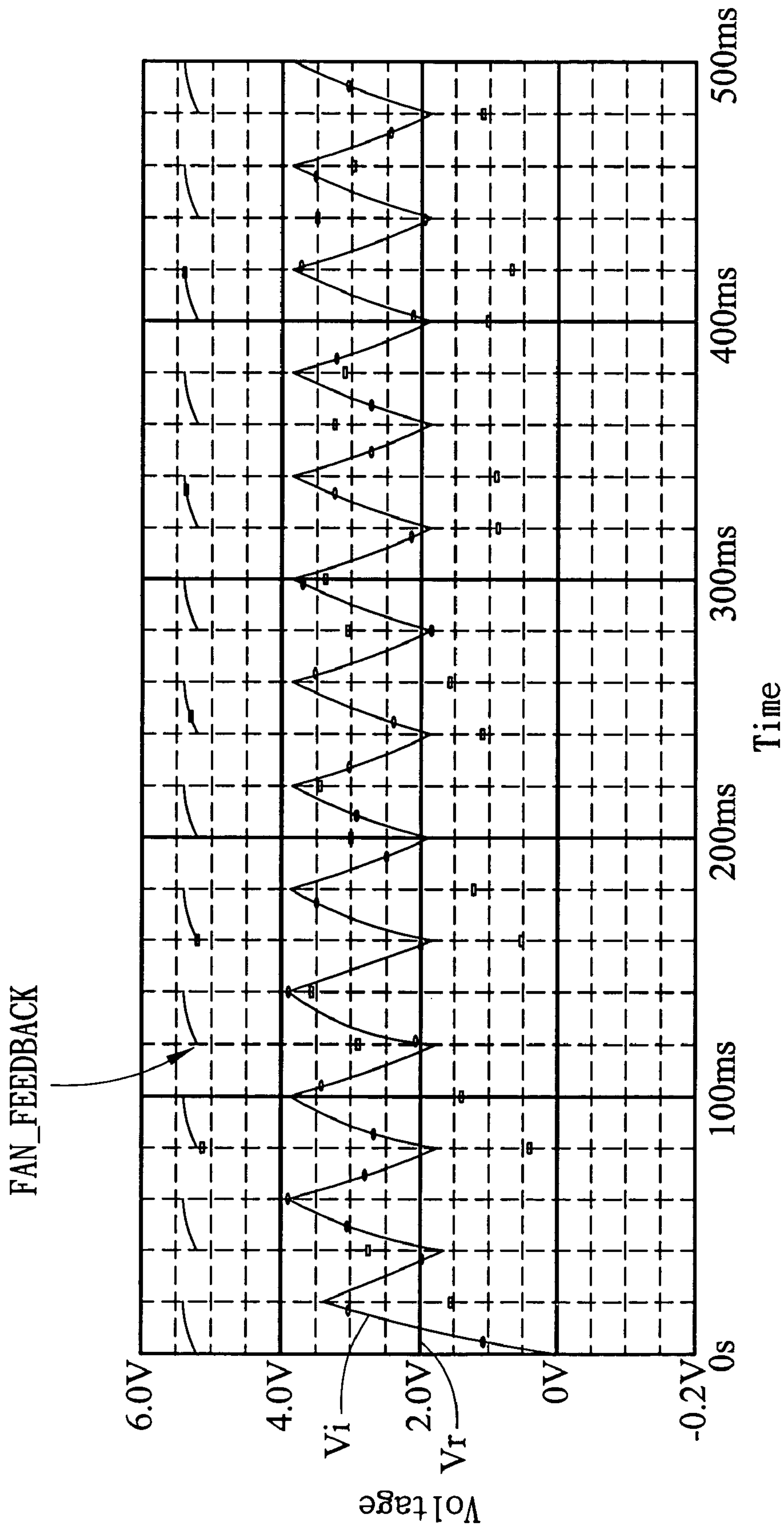
FIG. 3 is a timing chart showing the relationship between the signals FAN_FEEDBACK, Vi, and Vo.

Referring to the fan-pulse feedback circuit 32 in FIG. 2, the signal FAN_FEEDBACK is the pulse signal output by the cooling fan. The NPN transistor is turned on when the signal FAN_FEEDBACK is at high voltage level. Thus, the capacitor 324 is charged until the voltage level of the signal FAN_FEEDBACK returns to low voltage level. Therefore, a predetermined voltage level is formed at the reverse input terminal Vi of the comparator 326 by repeatedly charging the capacitor 324. In FIG. 3, a reference voltage is applied to the non-reverse input terminal Vr of the comparator 326 for comparison with the voltage level of the reverse input terminal Vi of the comparator 326. Here, the reference voltage is set to the voltage difference generated between both terminals of the capacitor 324 when the cooling fan is at the lowest allowable rotational speed, wherein the reference voltage can be adjusted by a variable resistor. Thus, the reverse input terminal Vi of the comparator 326 exceeds the reference voltage at the non-reverse input terminal Vr of the comparator 326 when the cooling fans operate normally, hence, the output terminal of the comparator 326 outputs a low logic level signal. Conversely, the reverse input terminal Vi of the comparator 326 is lower than the reference voltage at the non-reverse input terminal Vr of the comparator 326 when the rotational speed of the cooling fan is too slow, hence, the output terminal of the comparator 326 outputs a high logic level signal, representing abnormal cooling fan rotational speed.

Figure 4A:
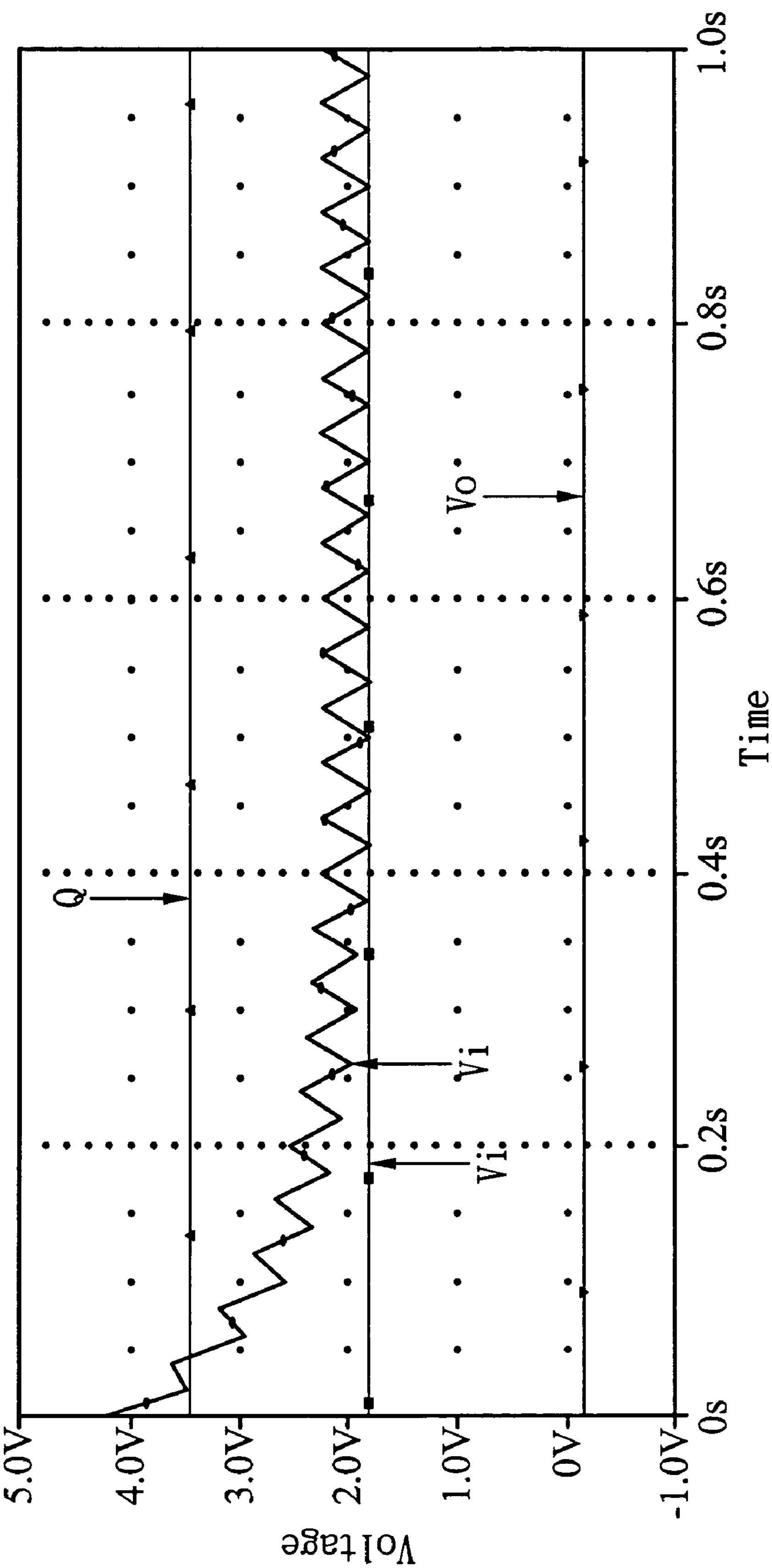
FIG. 4A is a signal-timing diagram showing the signals of the fan-pulse feedback circuit 32 and a status latch and protection drive circuit 34 when the rotational speed of the fan is normal.

The AND gate 342 of the status latch and protection drive circuit 34 outputs a low logic level signal "0" to the CLK terminal of the D-type flip-flop 344 when the rotational speed of the cooling fan is normal. FIG. 4A is a signal-timing diagram showing the signals of the fan-pulse feedback circuit 32 and a status latch and protection drive circuit 34 when the rotational speed of the fan is normal. Here, the reference voltage Vr is 1.8V, the voltage level of the reverse input terminal Vi of the comparator 326 is 1.9V when the duty cycle of the cooling fan is 40 ms, and the rotational speed of the cooling fan is 750 R.P.M. The comparator 326 outputs low logic level "0" to the input terminal of the AND gate 342 because the voltage level of the reverse input terminal Vi of the comparator 326 exceeds the reference voltage Vr. Therefore, the AND logic gate 342 outputs low logic level "0" to the CLK terminal of the D-type flip-flop 344. Thus, the Q terminal of the D-type flip-flop 344 outputs a high logic level "1".

Figure 4B:
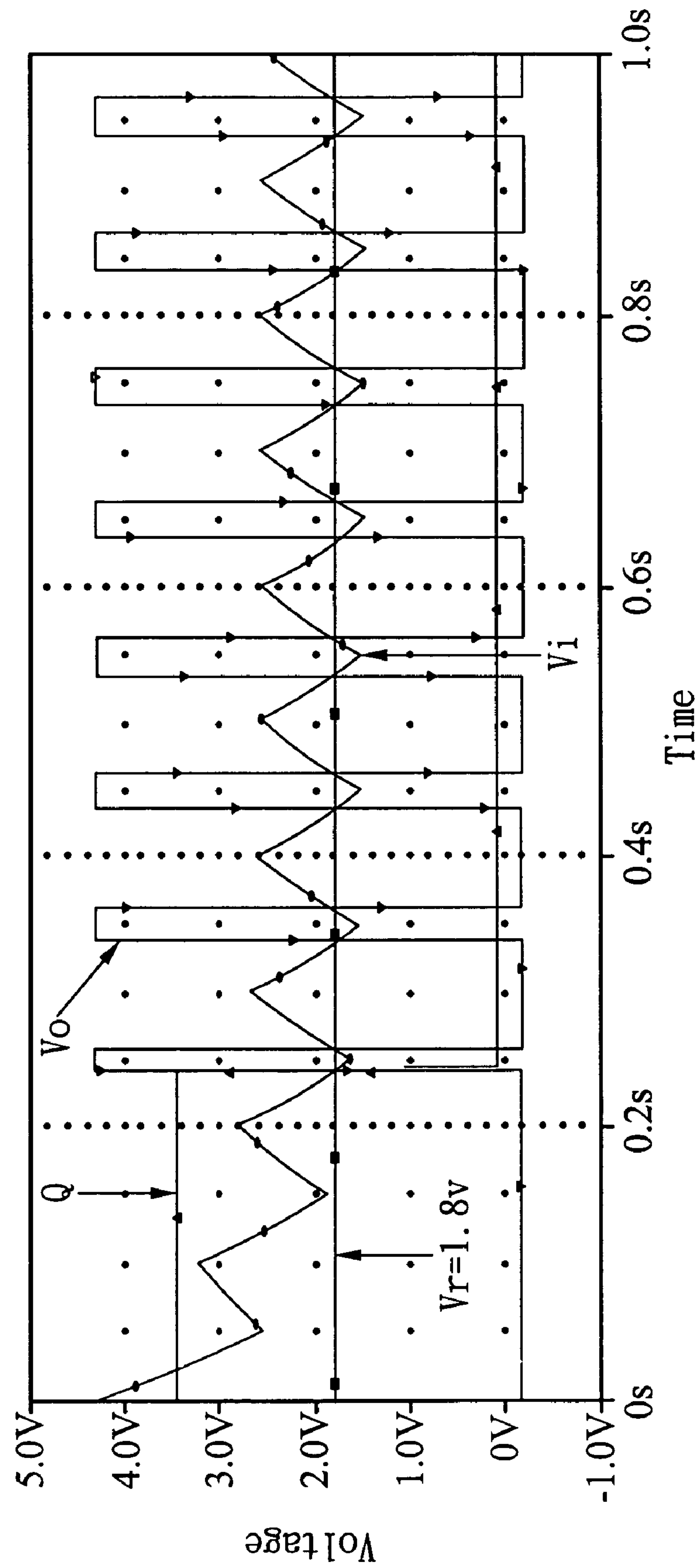
FIG. 4B is a signal-timing diagram showing the signals of the fan-pulse feedback circuit 32 and a status latch and protection drive circuit 34 when the rotational speed of the fan is abnormal.

FIG. 4B is a signal-timing diagram showing the signals of the fan-pulse feedback circuit 32 and a status latch and protection drive circuit 34 when the rotational speed of the fan is abnormal. The voltage level of the reverse input terminal Vi of the comparator 326 is 1.58V when the duty cycle of the cooling fan is 100 ms and the rotational speed of the cooling fan is 300 R.P.M. In FIG. 4B, the comparator 326 starts to output high logic level signal "1" to the input terminal of the AND gate 342 when the voltage level of the reverse input terminal Vi of the comparator 326 is less than the reference voltage Vr. Since the projector has been operational during a predetermined delay period, the boot-delay signal generating circuit 30 also outputs a high logic level signal "1" to the input terminal of the AND logic gate 342. Thus, the AND logic gate 342 outputs a high logic level signal "1" to the terminal CLK of the D-type flip-flop 344. Thus, the boot-delay signal generating circuit 30 triggers the D-type flip-flop 344 latching the logic signal output by the AND logic gate 342. In addition, the logic signal output from the terminal Q of the D-type flip-flop 344 changes to low logic level indicating that the rotational speed of the cooling fan is too slow when the terminal Q of the D-type flip-flop 344 outputs a low logic level signal. At this time, the responding system protection procedure is performed, such as resetting the CPU 18, turning off the system power or the lamp 12.

According to the projector and the status protection method of thereof, the protection procedure is performed by independent devices to control and detect the rotational speed of the cooling fan when abnormal system temperature is detected, without using the CPU. Thus, the problem of CPU failure due to interference from noise generated by the high start-voltage and electrostatic discharge of the lamp, are prevented and operating temperature of the projector is maintained. In addition the circuit for detecting the rotational speed of the cooling fan disclosed by the embodiment of the present invention is simple, and offers the advantages of high reliability and quick response, thus eliminating the need for the thermal interceptors of the conventional method.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A projector, comprising:

a power supply;

a lamp for providing a projector light source;

a starter for turning on the lamp;

an image processing system for outputting projected images according to a video signal;

a CPU for controlling the image processing system;

at least one cooling fans generating pulse signals according to the rotational speed of the cooling fan;

a charging circuit coupled to the cooling fan for generating a continuous charging signal;

a comparator for comparing the voltage level of the continuous charging signal with a reference voltage and generating a comparison signal with different voltage levels responding to the comparison result;

a signal generating circuit for generating a boot-delay signal after starting the lamp for a predetermined delay period;

an AND logic gate for receiving the comparison signal and the boot-delay signal and outputting a logic signal with a logic level; and a status latch and protection drive circuit for receiving the logic signal output from the AND logic gate and outputting a protection active signal to reset the CPU, shut down the power supply or the lamp when the logic level of the logic signal changes.

2. The projector as claimed in claim 1, wherein the pulse signal has a pulse frequency and the pulse frequency is increased when the rotational speed of the cooling fan increases.

3. The projector as claimed in claim 1, wherein the image processing system comprises:

an image processor for outputting image control signals according to input video signals;

a plurality of LCD panels for displaying images according to the image control signals;

a projector lens outputting the projected image; and a plurality of reflectors for reflecting the light of the lamp from the lamp to the liquid crystal display panel.

4. A status protection method of a projector having a CPU, a lamp, and a cooling fan for outputting a pulse signal having a frequency corresponding to the rotational speed of the cooling fan, comprising the following steps:

generating a continuous charging signal according the pulse signal output from the cooling fan;

obtaining voltage levels of the charging signal;

comparing the voltage level of the continuous charging signal with a reference voltage and generating a comparison signal with different voltage levels responding to the comparison result;

comparing the comparison signal and a boot-delay signal and outputting a logic signal with a logic level; and latching the logic level and generating a protection active signal to at least the power supply, the lamp, or the CPU, and to reset the CPU when the voltage level of the logic signal changes when the voltage level of the logic signal changes.

5. The status protection method of a projector as claimed in claim 4, wherein the pulse signal has a pulse frequency and the pulse frequency is increased when the rotational speed of the cooling fan increases.

6. A projector, comprising:

a power supply;

a lamp for providing a projector light source;

a starter for turning on the lamp;

an image processing system for outputting projected images according to a video signal;

a CPU for controlling the image processing system;

at least one cooling fans generating pulse signals according to the rotational speed of the cooling fan;

a charging circuit coupled to the cooling fan for generating a continuous charging signal;

a comparator for comparing the voltage level of the continuous charging signal with a reference voltage and generating a comparison signal with different voltage levels responding to the comparison result;

a signal generating circuit for generating a boot-delay signal after starting the lamp for a predetermined delay period;

an AND logic gate for receiving the comparison signal and the boot-delay signal and outputting a logic signal with a logic level; and a status latch and protection drive circuit for receiving the logic signal output from the AND logic gate and outputting a protection active signal to reset the CPU and shut down the power supply or the lamp when the logic level of the logic signal changes.

7. The projector as claimed in claim 6, wherein the pulse signal has a pulse frequency and the pulse frequency is increased when the rotational speed of the cooling fan increases.

8. The projector as claimed in claim 6, wherein the image processing system comprises:

an image processor for outputting image control signals according to input video signals;

a plurality of LCD panels for displaying images according to the image control signals;

a projector lens outputting the projected image; and a plurality of reflectors for reflecting the light of the lamp from the lamp to the liquid crystal display panel.

* * * * *